(12) United States Patent
Kostov

(10) Patent No.: US 8,666,870 B2
(45) Date of Patent: Mar. 4, 2014

(54) CONFIGURABLE STATE MODEL FOR SUPPLY CHAIN MANAGEMENT

(75) Inventor: Dimitar Gueorguiev Kostov, Fountain Valley, CA (US)

(73) Assignee: JDA Software Group, Inc., Scottsdale, AZ (US)

( * ) Notice: Subject to any disclaimer, the term of this patent is extended or adjusted under 35 U.S.C. 154(b) by 992 days.

(21) Appl. No.: 11/371,960

(22) Filed: Mar. 8, 2006

(65) Prior Publication Data

US 2006/0206410 A1 Sep. 14, 2006

Related U.S. Application Data

(60) Provisional application No. 60/660,747, filed on Mar. 10, 2005.

(51) Int. Cl.
*G06Q 40/00* (2012.01)

(52) U.S. Cl.
USPC ............................... 705/37; 705/67; 308/262

(58) Field of Classification Search
USPC ....................................... 705/67, 37; 380/262
See application file for complete search history.

(56) References Cited

U.S. PATENT DOCUMENTS

| 6,862,574 | B1 | 3/2005 | Srikant et al. | |
| 7,197,144 | B1* | 3/2007 | Casagrande | 380/262 |
| 2002/0091580 | A1 | 7/2002 | Wang | |
| 2002/0161688 | A1* | 10/2002 | Stewart et al. | 705/37 |
| 2005/0102243 | A1* | 5/2005 | Kinsella et al. | 705/67 |

FOREIGN PATENT DOCUMENTS

| TW | 200401210 | 1/2004 |
| TW | 200506689 | 2/2005 |
| WO | 02075682 | 9/2002 |

OTHER PUBLICATIONS

The Authoritative Dictionary of IEEE Standard Terms, 2000, The Institute of Electrical and ElectronicEngineers, Inc., Seventh Ed., 2000, p. 1102.*
English translation of Search Report for Taiwanese Patent Application No. 095107993.

\* cited by examiner

*Primary Examiner* — Charles Kyle
*Assistant Examiner* — Siegfried E Chencinski
(74) *Attorney, Agent, or Firm* — Jackson White, PC; Steven J. Laureanti

(57) ABSTRACT

Methods and systems for supply chain management in accordance with a state model. A supply chain management system includes a transaction state module within an inter-enterprise server assessable by trading partners. The transaction state module can define a state model which allows a trading partner to view a transaction and perform an action in accordance with a state of the transaction. The state model describes, in association with each state, which of the trading partners have visibility to the transaction and ability to perform an action. The trading partners can include consumers, retailers, distributors, etc. The transactions can include a forecast order, a purchase order, a billing, a product shipment, a payment, an invoice, a credit memo, a request for quote (RFQ), and a return material authorization (RMA). States of the transaction can include, for example, create, open, public view, private view, publish, commit, cancel, supersede, and the like.

23 Claims, 7 Drawing Sheets

430

432

| Cancel | Step 2: Transaction Visibility ▼ |

Transaction would be visible while it is in certain state.

- ☑ Closed
- ☑ Committed
- ☐ Draft
- ☑ Pending Commit
- ☑ Private Draft
- ☑ Public Draft
- ☐ Published
- ☐ Superseded

Define actions and state transitions.

Transaction Level: [Order Header ▼]   Partner Role: [All]

|  | Cancelled | Closed | Deferred | Draft |
|---|---|---|---|---|
| START |  |  |  | [Add Action] |
| Cancelled | [Add Action] |  | [Add Action] | [Add Action] |
| Closed |  | [Add Action] | [Add Action] | [Add Action] |
| Deferred | [Add Action] | [Add Action] | [Add Action] |  |
| Draft | [Add Action] | [Add Action] | [Add Action] | [Add Action] |
| Open | [Add Action] | [Add Action] | [Add Action] |  |
| Pending | [Add Action] | [Add Action] | [Add Action] |  |
| Pending [B] | [Add Action] | [Add Action] | [Add Action] |  |
| Pending [S] | [Add Action] | [Add Action] | [Add Action] |  |
| Pending [Third Party] | [Add Action] | [Add Action] | [Add Action] |  |

| Save | Cancel |

◉ New Action  [Submit ▼]

Executed by:
☐ Buyer  ☐ Manufacturer  ☐ Supplier  ☐ Vendor

When this action occurs set the 'Order Line' state to:
◉ Unchanged
○ Predefined  [Draft ▼]
○ Determined by a Rule ☐ Fire Rule

FIG. 4E

CONFIGURABLE STATE MODEL FOR SUPPLY CHAIN MANAGEMENT

CROSS-REFERENCE TO RELATED APPLICATIONS

This application claims priority under 35 U.S.C. 119(e) to co-pending U.S. Provisional Patent Application No. 60/660,747, entitled "Configurable State Model For Supply Chain Management," filed on Mar. 10, 2005, the subject matter of which is incorporated by reference herein in its entirety; and this application is related to the following commonly owned applications: U.S. patent application Ser. No. 11/158,371, filed on Jun. 22, 2005 and entitled "Program-Based Supply Chain Management", which claims the benefit of U.S. Provisional Patent Application No. 60/659,829, filed on Mar. 8, 2005 and entitled "Program-Based Supply Chain Management" and U.S. patent application Ser. No. 11/371,985, filed on Mar. 8, 2006 and entitled "Custom Application Builder for Supply Chain Management", which claims the benefit of U.S. Provisional Patent Application No. 60/660,543, filed on Mar. 9, 2005 and entitled "Custom Application Builder for Supply Chain Management".

BACKGROUND OF THE INVENTION

1. Field of the Invention

The present invention relates to supply chain management, and more specifically, to inter-enterprise supply chain management software that manages supply chain transaction data using programs.

2. Description of the Related Art

Outsourcing has become very popular in all sectors of the industry and especially in product manufacturing. Companies no longer manufacture and assemble all components of a product themselves, but outsource most or all parts of the development, manufacturing, distribution, and marketing of the product. For example, companies A and B may manufacture and sell parts to company C. Company C may assemble those parts and sell assembled modules of a product to company D. Company D may assemble such modules together with other components and modules obtained from other companies, and sell the final product to Company E. Company E may sell the product under its brand to a distributor Company F which sells the final product to a retailer company G, which eventually sells the final product to the end consumer.

Since most or all parts of the development, manufacturing, distribution, and marketing of the product are outsourced, no single company has control of all the supply chain transaction data and information relating to the overall development, manufacturing, distribution, and marketing of the product. Therefore, enterprise supply chain management software that manages the data relating to the role played by only one company in the process of development, manufacturing, distribution, and marketing of the product cannot effectively manage the entire outsourcing process.

Conventional inter-enterprise supply chain management software resides in a separate location apart from and between the various companies. The various companies involved in such process exchange data with the conventional inter-enterprise supply chain management software according to the format of their own enterprise supply chain management software, and are able to view or perform actions on certain supply chain management transaction data (e.g., placing an order, paying an invoice) using the conventional inter-enterprise supply chain management software. At the same time, such companies are able to obtain and monitor information on the entire process of development, manufacturing, distribution, and marketing of the product through the conventional inter-enterprise supply chain management software.

One shortcoming of the conventional inter-enterprise supply chain management software is that transactions are typically presented from one point of view. In other words, similar options for viewing and performing actions against a transaction can be presented to each user regardless of their role in the transaction or a current state of the transaction.

Therefore, what is needed is a method of system for allowing accessibility to transactions in a supply chain management system in accordance with a configurable state model.

SUMMARY

The present invention provides methods and systems for supply chain management in accordance with a state model. In one embodiment, a supply chain management system includes a transaction state module within an inter-enterprise server assessable by trading partners. The transaction state module can define a state model which allows a trading partner to view a transaction and perform an action in accordance with a state of the transaction. The state model describes, in association with each state, which of the trading partners have visibility to the transaction and ability to perform an action. The trading partners can include consumers, retailers, distributors, etc. The transactions can include a forecast of an order or an actual order. States of the transaction can include, for example, create, open, public view, private view, publish, commit, cancel, supersede, and the like.

In one embodiment, a default state model establishes parameters based on a role of the trading partner in the supply chain. For example, a retailer that originally places a transaction can have full visibility and action privileges throughout the lifecycle of the transaction. On the other hand, a supplier may only be able to view a transaction once it has been committed to by the retailer. In addition, the supplier may be able to close the transaction, while the retailer is not able to do so. The privileges can be set according to factors such as business processes, company policy, or industry norms.

Advantageously, the supply chain management system can automatically control access on a per-trading partner basis using the configurable state model.

The features and advantages described herein are not all inclusive, and, in particular, many additional features and advantages will be apparent to one skilled in the art in view of the drawings, specifications, and claims. Moreover, it should be noted that the language used in the specification has been principally selected for readability and instructional purposes and may not have been selected to circumscribe the claimed invention.

BRIEF DESCRIPTION OF THE DRAWINGS

The teachings of the present invention can be readily understood by considering the following detailed description in conjunction with the accompanying drawings. Like reference numerals are used for like elements in the accompanying drawings.

FIGS. 4A-E are user interfaces for configuration the state model according to one embodiment of the present invention.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF EMBODIMENTS

Methods and systems for supply chain management with a state model are described. Generally, the state model refers to a status of a transaction that is within a supply chain. The status can be affected by various trading partners that perform actions with respect to the transaction. For example, a supplier can check the availability of goods at a central warehouse responsive to a purchase order received from a retailer. In the meantime, the supplier can change the state of the purchase order from open to pending commit. Satisfied that the order can be fulfilled, the supplier can change the state from pending commit to commit. The goods can be shipped from a central warehouse to a regional warehouse and updated within the supplier's proprietary supply chain management system without affecting the information available to the retailer (i.e., no change in state). Once the shipping has occurred, the retailer can change the state from pending or commit to close. One of ordinary skill in the art will recognize that the embodiment described herein with respect to a supply chain is only exemplary and can be modified for different applications such as a package delivery system or the like.

Figure 1:
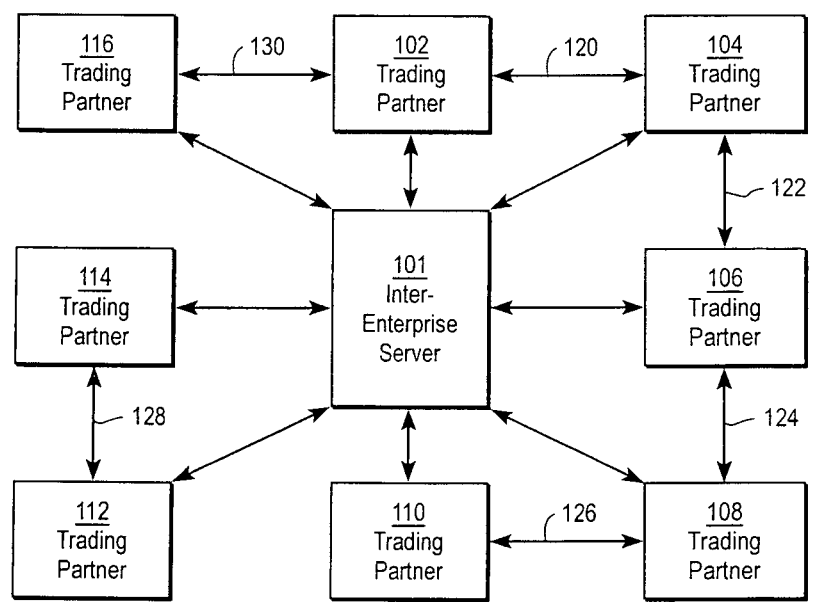
FIG. 1 is a block diagram of a supply chain management system using a state model according to one embodiment of the present invention.

FIG. 1 is a block diagram illustrating a system 100 for supply chain management according to one embodiment of the present invention. System 100 comprises an inter-enterprise server 101 in communication with various trading partners 102, 104, 106, 108, 110, 112, 114, 116 through, for example, a data network (e.g., the Internet). Trading partners 102-116 in the supply chain interact with one another in the process of developing, manufacturing, marketing and selling one or more products. A number of trading relations 120, 122, 124, 126, 128, and 130 exist, where each trading relation involves two trading partners. For example, the trading relation 122 involves two trading partners 104, 106. In one embodiment, trading relations 120-130 affect how the state model is configured.

Trading partners 102-116 can exchange supply chain data with inter-enterprise server 101 and other trading partners 102-116. Trading partners 102-116 can comprise a computing device (e.g., a personal computer or server device) operated by a company or other type of entity involved in the supply chain. Trading partners 102-116 can have different roles relative to other trading partners 102-116 as transactions progress through the supply chain. The roles within system 101 can include buyers, manufacturers, suppliers, and vendors. Trading partners 102-116 typically maintain their own enterprise supply chain management software for managing its own supply chain transaction data. However, some of the supply chain transaction data is shared with other trading partners 102-116 for the purpose of tracking. More specifically, trading partners 102-116 can change a state associated with the transaction. Changes in state can result from various actions such as placing a purchase order (PO), billing, shipping a product, remitting a payment, etc. For example, one trading partner 108 may be waiting for parts to arrive from another trading partner 110, but would not know whether such parts were shipped from the trading partner 110 unless trading partner 110 makes such information available to trading partner 108. In one embodiment, trading partners 102-116 are only able to view transactions in accordance with a state model. In another embodiment, trading partners 102-116 are only able to make changes to the state in accordance with the state model.

Inter-enterprise server 101 exchanges the supply chain data with trading partners 102-116 as described. Inter-enterprise server 101 can be a computing device (e.g., a personal computer or a server device) operated by a service provider for supply chain management. In one embodiment, inter-enterprise server 101 manages a state model associated with each transaction. When trading partners 102-116 access inter-enterprise server 101 to view the supply chain data and to potentially perform actions on the transactions, inter-enterprise server 101 allows viewing or changes in accordance with the state model. Inter-enterprise server 101 and the state models are described in further detail below.

Figure 2:
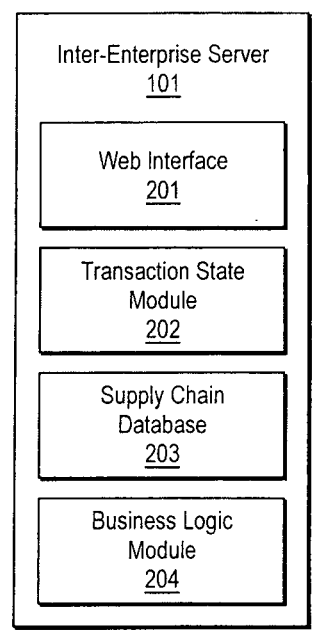
FIG. 2 is a block diagram of an inter-enterprise server of the supply chain management system according to one embodiment of the present invention.

FIG. 2 is a block diagram of inter-enterprise server 101 according to one embodiment of the present invention. Inter-enterprise server 101 comprises a web interface 201, a transaction state module 202, supply chain database 203, and business logic module 204. Inter-enterprise server 101 can include additional components (not shown) such as a processor, a hard driver, etc.

In one embodiment, web interface 201 interfaces with the trading partners by packing and unpacking the supply chain data in data packets suitable for transport across the network (e.g., TCP/IP packets). Web interface 201 can also provide a set of application programming interfaces, or APIs, for issuing commands to transaction state module 202.

Transaction state module 202 allows configuration of state models for transactions. For example, a wizard displays a set of user interfaces such as those illustrated below. Transaction state module 202 stores the configurations in a memory device (not shown) such as hard drive or a RAM device. In response to access by a trading partner 102-116, transactions state module 202 refers to the state model to determine visibility configurations and outputs supply chain data from supply chain database 203. When actions are requested against the transaction, transaction state module 202 refers to the state model to determine action configurations and can implement business logic rules from business logic module 204. For example, business logic module can send out an e-mail to a purchasing department of an initiating trading partner once an order has been closed. Methods implemented within transaction state module 202 are discussed further below.

Figure 3:
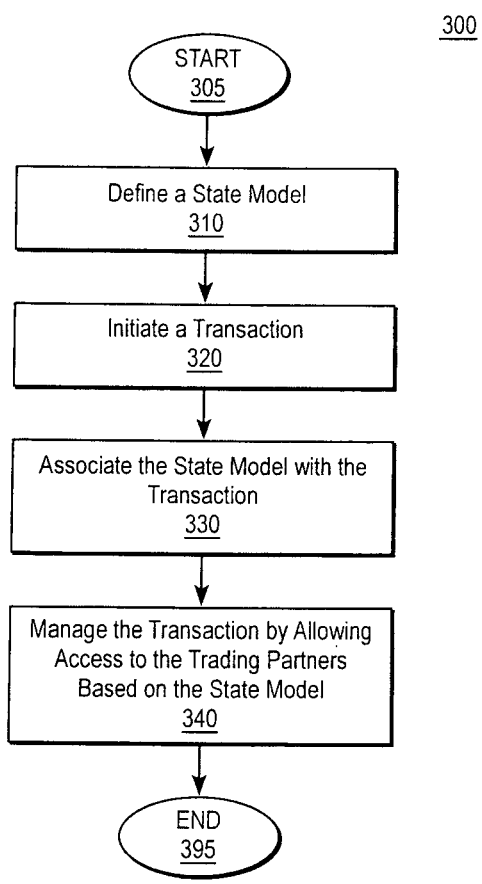
FIG. 3 is a flow chart illustrating a method for managing a supply chain with the state model according to one embodiment of the present invention.

FIG. 3 is a flow chart illustrating a method 300 for managing transaction states in during supply chain management according to one embodiment of the present invention. The method 300 can be implemented a system for supply chain management (e.g., system 100).

Figures 4A, 4B:
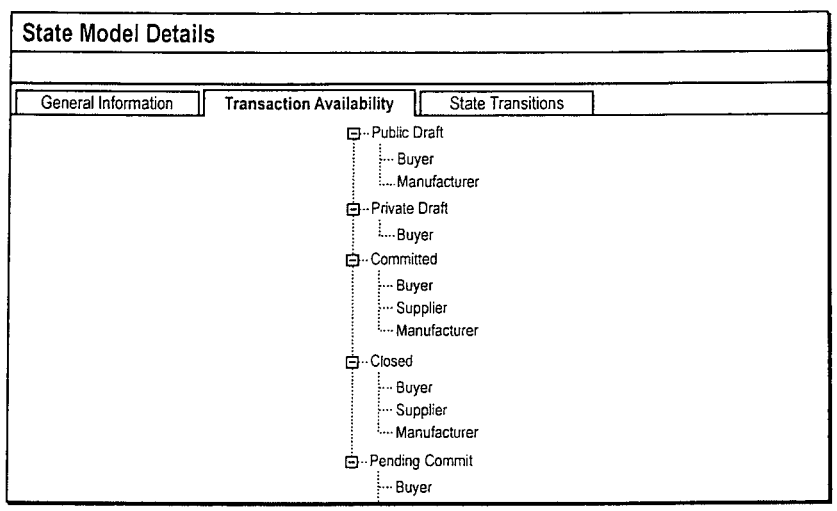

A state model is defined 310 by, for example, an administrator of supply chain management system, a trading partner (e.g., one of trading partners 106-112), or a vendor (e.g., default state models) using, for example, user interfaces shown in FIGS. 4A-E. More specifically, FIG. 4A shows a user interface 410 for entering general information 412 about the state model such as name 414 and transaction type 416. FIG. 4B shows a user interface 420 for viewing transaction visibility for each of the trading partners, and FIG. 4C shows a user interface 430 for selecting transaction visibility 432. FIG. 4D shows a user interface 440 for selecting actions for state transitions. FIG. 4E shows a user interface 450 for selecting how a role of the trading partner that performs an action will affect the state. In one embodiment, the state model is pre-defined, and thus only needs to be associated with a particular transaction. Additionally, default state models that are configured according to industry norms can be supplied by a vendor. The trading partner can either modify an existing state model or fully customize the state model to suit their business process.

The availability of a transaction refers to which of the trading partners will be able to view, or have visibility to, the transaction. For example, a supplier may be unable to view a transaction as a public draft of a buyer until it is committed. Table 1 is an example of transaction availability for a forecast transaction; table 2 is an example of transaction availability for a create order action; and table 3 is an example of transaction availability for an order transaction.

TABLE 1

Transaction visibility for a forecast transaction

| | Buyer | Manufacturer | Supplier |
|---|---|---|---|
| Public Draft | ✓ | ✓ | |
| Private Draft | ✓ | | |
| Committed | ✓ | ✓ | ✓ |
| Closed | ✓ | ✓ | ✓ |
| Pending Commit | ✓ | ✓ | ✓ |

TABLE 2

Transaction visibility for a create order action.

| Order Type | Customer | Supplier |
|---|---|---|
| Standard | ✓ | |
| Blanket | ✓ | |
| Transfer | ✓ | ✓ |
| Consignment | | ✓ |
| Proxy | | ✓ |
| Blanket Proxy | | ✓ |
| RMA | | ✓ |

TABLE 3

Transaction visibility for an order transaction

| | Buyer | Manufacturer | Supplier | Third Party |
|---|---|---|---|---|
| Cancelled | | | | |
| Closed | | | | |
| Deferred | | | | |
| Draft | | | | |
| Open | ✓ | ✓ | ✓ | |
| Pending | ✓ | | ✓ | |
| Pending(B) | ✓ | | ✓ | |
| Pending(S) | ✓ | | ✓ | |
| Pending(Third Party) | | | | |
| Pending Cancel | | | | |
| Pending Cancel(B) | | | | |
| Pending Cancel(S) | | | | |

The trading partner can initiate 320 a transaction. The transaction can be, for example, a forecast order, a purchase order (PO), a billing, a product shipment, a payment, an invoice, a credit memo, a request for quote (RFQ), and a return material authorization (RMA). For example, a buyer can place an order for televisions with a manufacturer. In turn, the manufacturer can place several orders for components from its suppliers.

The trading partner associates 330 the state model with the transaction. An inter-enterprise server (e.g., inter-enterprise server 101) can manage 340 the transaction by allowing access to the trading partners based on the state model, as described further in FIG. 5.

Figure 5:
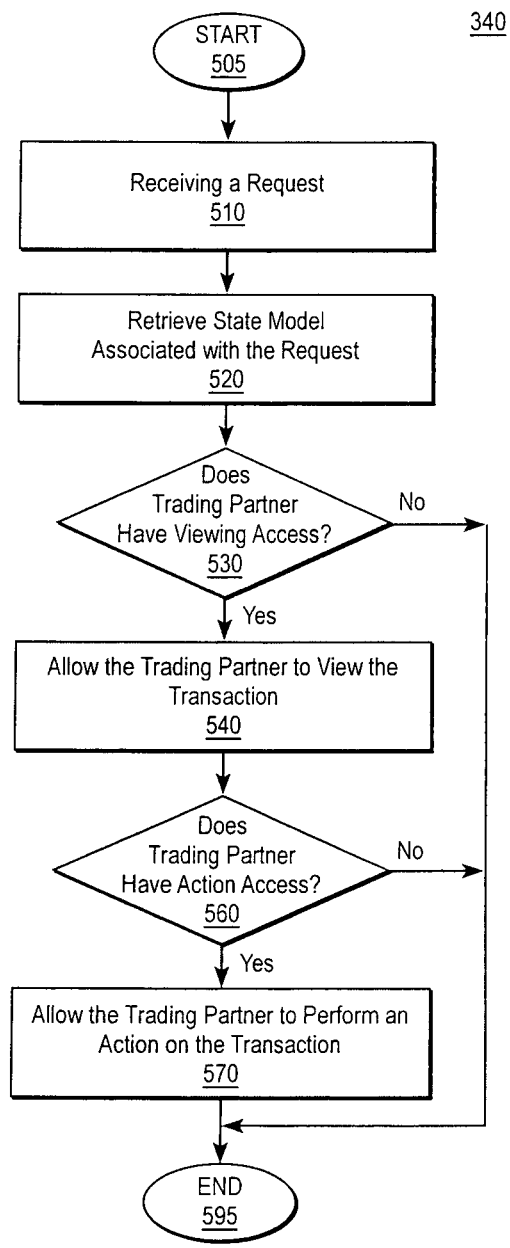
FIG. 5 is a flow chart illustrating a method for managing the transaction by allowing access to trading partners based on the state model according to one embodiment of the present invention.

FIG. 5 is a flow chart illustrating a method 340 for managing the transaction by allowing access to the trading partners based on the state model according to one embodiment of the present invention. A transaction state module (e.g., transaction state module 202) receives 510 an access request from the trading partner. The access request can include a request to view a transaction, and/or a request to perform an action on the transaction.

The transaction state module retrieves 520 the state model associated with the request from, for example, a supply chain database (e.g., supply chain database 203). If the trading partner has viewing access to the transaction 530, the transaction state module allows 540 the trading partner to view. If the partner has action access to the transaction 560, the transaction state module allows 570 the trading partner to perform an action on the transaction. Depending on the action and/or the trading partner, and action can result in a new state for the transaction.

Figure 6:
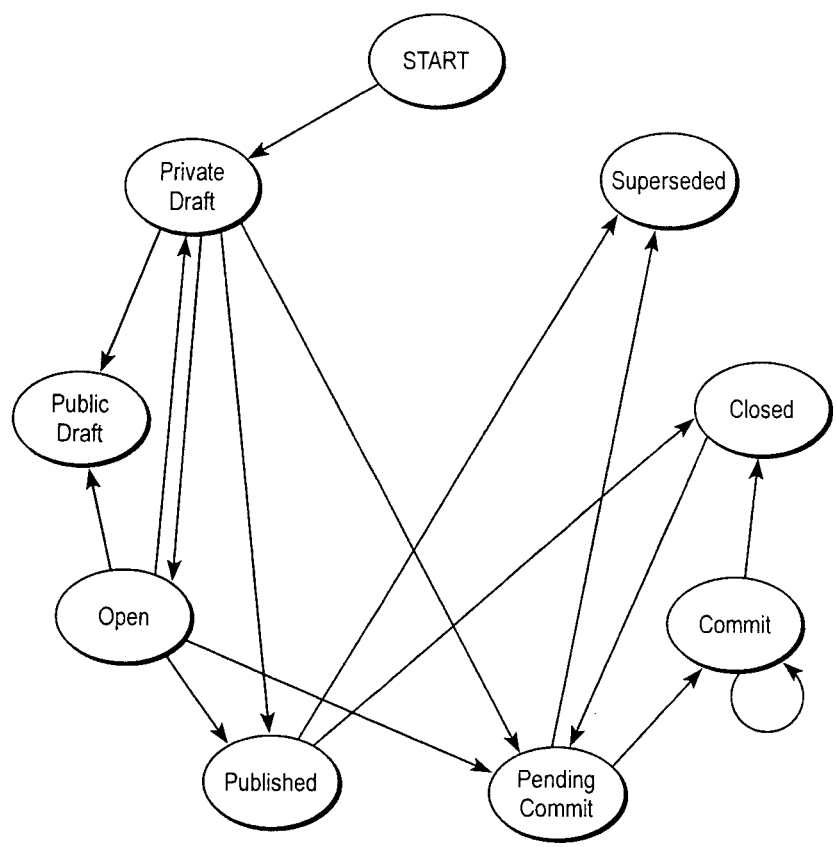
FIG. 6 is a state diagram illustrating an example of state transitions according to one embodiment of the present invention.

Table 4 illustrates example actions available to a forecast transaction, and table 5 illustrates the change in state as a result of the action. The rows of table 5 represent source states, the cells represent actions performed against the transaction, and the columns represent the destination states resulting from the action. For example, a transaction at the open state changes to the pending commit state responsive to a submit action. In addition, FIG. 6 is a state diagram 600 that illustrates states and actions associated with table 5. Table 6 illustrates example actions available to an order transaction, and table 7 illustrates the change in state as a result of the action. Table 8 illustrates the change in state as a result of the action on an order header for a buyer. Table 9 illustrates the change in state as a result of the action on an order line for a buyer. Table 10 illustrates the change in state as a result of the action on an order line for a supplier.

TABLE 4 illustrates example actions available to a forecast transaction

| | |
|---|---|
| Close | The Buyer or Supplier closes the Forecast |
| Commit | The Supplier commits to the Forecast |
| Create (START) | The Buyer adds a new Forecast |
| Open | The user opens the draft Forecast for editing |
| Make Private | The Buyer makes the draft Forecast private |
| Make Public | The Buyer makes the draft Forecast public |
| Modify | Modify the Forecast |
| Publish | The Buyer submits the Forecast; no commit is required |
| Re-Commit | The Supplier re-commits to the Forecast |
| Submit | The Buyer submits the Forecast; a commit is required |
| Supercede | The Rules Engine automatically moves "duplicate" Forecasts to superceded |
| UnClose | The Buyer or Supplier uncloses a Closed Forecast; it reverts to its previous state |

TABLE 5 illustrates the change in state as a result of the action.

| Forecast | Private Draft | Public Draft | Open | Published | Pending Commit | Committed | Closed | Superceded |
|---|---|---|---|---|---|---|---|---|
| (START) | Create | | | | | | | |
| Private Draft | | Make Public | Open | Publish | Submit | | | |
| Public Draft | Make Private | | Open | Publish | Submit | | | |
| Open | Make Private | Make Public | | Publish | Submit | | | |
| Published | | | | | | | Close | Supercede |
| Pending Commit | | | | | | Commit | Close | Supercede |
| Committed | | | | | | | Close | |
| Closed | | | Un-close | Un-close | | Un-close | | |
| Superceded | | | | | | | | |

TABLE 6 illustrates example actions available to an order transaction

| | |
|---|---|
| Accept | Accept the proposed order changes; once accepted, there is considered to be agreement on all the terms of the order |
| Cancel | Allows the user to perform a unilateral cancellation of the order; once the action is performed, the order is cancelled |
| Close | Close the Order |
| Create | Create and submit a new order |
| Defer | Defer action on the order |
| Delete | Delete an existing order ("hard" delete), an administrative function |
| Finish | Finish items on the order (supplier action only) |
| Modify Order | Allows the user to modify an order that is not pending action by the modifying party; the order header information can be edited and send to the other party |
| Receive | Receive items on the order |
| Reject | Reject pending order changes (roll back or go to pending??) |
| Reply with Changes | Propose modifications to an order that is pending action from the side taking the action |
| Request to Cancel | Request cancellation of the order (collaborative cancellation) |
| Save Draft | Saves the order in Draft state; applies only to orders that have not been submitted to trading partners |
| Ship | Ship items on an order |
| Split Line | Split an existing line into multiple lines |
| Submit | Publishes a draft order |
| Undo Cancel | Makes a cancelled order active |
| Undo Close | Makes a closed order active |

TABLE 7 illustrates example actions available to an order line

| | |
|---|---|
| Accept | Accept the proposed line changes; once accepted, there is considered to be agreement on all the terms of the line |
| Cancel | Allows the user to perform a unilateral cancellation of the line; once the action is performed, the line is cancelled |
| Close | Close an Order Line |
| Defer | Defer action on the line |
| Delete | Delete an existing line ("hard" delete), an administrative function |
| Finish | Finish items on the line (supplier action only) |
| Modify Line | Allows the user to modify a line that is not pending action by the modifying party: this action can also create an Order Line |
| Receive | Receive items on the line |
| Reject | Reject pending line changes (roll back or go pending??) |
| Reply with Changes | Propose modifications to a line that is pending action from the side taking the action |
| Request to Cancel | Request cancellation of the line (collaborative cancellation) |
| Ship | Ship items on the line |
| Split Line | Split an existing line into multiple lines |
| Undo Cancel | Makes a cancelled line active |
| Undo Close | Makes a closed line active |

TABLE 8 illustrates the change in state as a result of the action on an order header for a Buyer.

| Order | Draft | Pndg (S) | Pndg (B) | Open | P Cncl (B) | P Cncl (S) | Dfrd | Clsd | Cncld | Pndg |
|---|---|---|---|---|---|---|---|---|---|---|
| (START) | SavD | Crte | | | | | | | | (Mod) |
| Draft | | Sbmt | Sbmt | | | | | | | |
| Pending(S) | | RChg Mod Rej | RChg Mod Rej | Acpt | ReqC | ReqC | Def | Cls | Can | (Mod) |
| Pending(B) | | RChg Mod Rej | RChg Mod Rej | Acpt | ReqC | ReqC | Def | Cls | Can | (Mod) |
| Open | | Mod RChg Mod Rej | Mod RChg Mod Rej | | ReqC | ReqC | Def | Cls | Can | |
| Pending Cancel(B) | | | | | | | Def | Cls | Acpt Can | |

TABLE 8-continued illustrates the change in state as a result of the action on an order header for a Buyer.

| Order | Draft | Pndg (S) | Pndg (B) | Open | P Cncl (B) | P Cncl (S) | Dfrd | Clsd | Cncld | Pndg |
|---|---|---|---|---|---|---|---|---|---|---|
| Pending Cancel(S) | | RChg Mod Rej | RChg Mod Rej | | | | Def | Cls | Acpt Can | |
| Deferred | | Mod | Mod | | ReqC | ReqC | | Cls | Can | |
| Closed | | | | | | | | | | UnCl |
| Cancelled | | | | | | | | | | UnCa |
| Pending | | Mod Rej | Mod Rej | Acpt | ReqC | ReqC | Def | Cls | Can | |

TABLE 9 illustrates the change in state as a result of the action on an order line for a Buyer.

| Order Line | Draft | Pndg (S) | Pndg (B) | Open | P Cncl (B) | P Cncl (S) | Dfrd | Clsd | Cncld |
|---|---|---|---|---|---|---|---|---|---|
| (START) | | (Mod) | | | | | | | |
| Draft | Mod SpLn | | | | | | | | |
| Pending(S) | | Mod SpLn | | | | ReqC | Def | Cls | Can |
| Pending(B) | | RChg Rej SpLn | | Acpt | | ReqC | Def | Cls | Can |
| Open | | Mod SpLn | | | | ReqC | Def | Cls | Can |
| Pending Cancel(B) | | RChg Rej SpLn | | | | | Def | Cls | Acpt Can |
| Pending Cancel(S) | | Mod SpLn | | | | | Def | Cls | Can |
| Deferred | | Mod Rej | | | | ReqC | | Cls | Can |
| Closed | | UnCl | | | | | | | |
| Cancelled | | UnCa | | | | | | | |

TABLE 10 illustrates the change in state as a result of the action on an order line for a Supplier.

| Order Line | Draft | Pndg (S) | Pndg (B) | Open | P Cncl (B) | P Cncl (S) | Dfrd | Clsd | Cncld |
|---|---|---|---|---|---|---|---|---|---|
| (START) | | | AdLn | | | | | | |
| Draft | Mod SpLn | | | | | | | | |
| Pending(S) | | | RChg SpLn | Acpt | ReqC | | Def | Cls | Can |
| Pending(B) | | | Mod Rej SpLn | | ReqC | | Def | Cls | Can |
| Open | | | Mod SpLn | | ReqC | | Def | Cls | Can |
| Pending Cancel(B) | | | Mod SpLn | | | | Def | Cls | Can |
| Pending Cancel(S) | | | RChg Mod Rej | | | | Def | Cls | Acpt Can |
| Deferred | | | Mod Rej | | ReqC | | | Cls | Can |

TABLE 10-continued illustrates the change in state as a result of
the action on an order line for a Supplier.

| Order Line | Draft | Pndg (S) | Pndg (B) | Open | P Cncl (B) | P Cncl (S) | Dfrd | Clsd | Cncld |
|---|---|---|---|---|---|---|---|---|---|
| Closed | | | UnCl | | | | | | |
| Cancelled | | | UnCa | | | | | | |

The order in which the steps of the methods of the present invention are performed is purely illustrative in nature. The steps can be performed in any order or in parallel, unless otherwise indicated by the present disclosure. The methods of the present invention may be performed in hardware, firmware, software, or any combination thereof operating on a single computer or multiple computers of any type. Software embodying the present invention may comprise computer instructions in any form (e.g., source code, object code, interpreted code, etc.) stored in any computer-readable storage medium (e.g., a ROM, a RAM, a magnetic media, a compact disc, a DVD, etc.). Such software may also be in the form of an electrical data signal embodied in a carrier wave propagating on a conductive medium or in the form of light pulses that propagate through an optical fiber.

While particular embodiments of the present invention have been shown and described, it will be apparent to those skilled in the art that changes and modifications may be made without departing from this invention in its broader aspect and, therefore, the appended claims are to encompass within their scope all such changes and modifications, as fall within the true spirit of this invention.

In the above description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus can be specially constructed for the required purposes, or it can comprise a general-purpose computer selectively activated or reconfigured by a computer program stored in the computer. Such a computer program can be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and modules presented herein are not inherently related to any particular computer or other apparatus. Various general-purpose systems can be used with programs in accordance with the teachings herein, or it may prove convenient to construct more specialized apparatuses to perform the method steps. The required structure for a variety of these systems will appear from the description below. In addition, the present invention is not described with reference to any particular programming language. It will be appreciated that a variety of programming languages can be used to implement the teachings of the invention as described herein. Furthermore, as will be apparent to one of ordinary skill in the relevant art, the modules, features, attributes, methodologies, and other aspects of the invention can be implemented as software, hardware, firmware or any combination of the three. Of course, wherever a component of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present invention is in no way limited to implementation in any specific operating system or environment.

It will be understood by those skilled in the relevant art that the above-described implementations are merely exemplary, and many changes can be made without departing from the true spirit and scope of the present invention. Therefore, it is intended by the appended claims to cover all such changes and modifications that come within the true spirit and scope of this invention.

What is claimed is:

1. A computer-implemented method comprising:
storing, by a programmed computer system, data representing a plurality of states of transactions among a plurality of trading partners in a supply chain;
determining, by a programmed computer system, a state model for a transaction that describes a plurality of states of the transaction, the state model comprising accessibility parameters of a transaction based on a role of the trading partner in the supply chain and transition parameters for transition of the transaction amongst the plurality of states; and
providing, by the programmed computer system, the trading partner access to the transaction in accordance with the accessibility parameters of the state model.

2. The method of claim 1, further comprising:
determining action privilege parameters of the trading partner based on the role of the trading partner in the supply chain; and
determining that the trading partner has access to perform an action on the transaction in accordance with the action privilege parameters.

3. The method of claim 2, further comprising:
receiving a request from the trading partner to perform the action;
determining from the state model how the action affects the state of the transaction; and
changing the state of the transaction.

4. The method of claim 2, further comprising:
receiving a request from the trading partner to perform a second action;
determining from the state model that the trading partner does not have action access to the second action of the transaction based on the state of the transaction; and
preventing the trading partner from having action access to the second action.

5. The method of claim 1, further comprising:
receiving a request from the trading partner to access a second transaction;
determining from the state model that the trading partner does not have access to the second transaction based on the state of the transaction; and
preventing the trading partner from having viewing access to the second transaction.

6. The method of claim 1, further comprising:
providing a default state model for use as the state model, the default state model having preconfigured descriptions.

7. The method of claim 1, wherein the transaction comprises one from the group comprising: a forecast order, a purchase order, a billing, a product shipment, a payment, an invoice, a credit memo, a request for quote (RFQ), and a return material authorization (RMA).

8. The method of claim 1, wherein an action comprises one from the group comprising:
create, accept, cancel, close, defer, delete, finish, modify line, receive, reject, reply with changes, request to cancel, ship, split line, undo cancel, and undo close.

9. The method of claim 1, wherein the plurality of states of the transaction comprise private draft, public draft, open, published, pending, commit, closed, and superseded.

10. A non-transitory computer-readable medium embodied with software that when executed using one or more computer systems is configured to:
store data representing a plurality of states of transactions among a plurality of trading partners in a supply chain;
determine a state model for a transaction that describes a plurality of states of the transaction, the state model further comprising accessibility parameters of a transaction based on a role of the trading partner in the supply chain and transition parameters for transition of the transaction amongst the plurality of states; and
provide the trading partner access to the transaction in accordance with the accessibility parameters of the state model.

11. The non-transitory computer-readable medium of claim 10, wherein the software is further configured to:
determine action privilege parameters of the trading partner based on the role of the trading partner in the supply chain; and
determine that the trading partner has access to perform an action on the transaction in accordance with the action privilege parameters.

12. The non-transitory computer-readable medium of claim 11, wherein the software is further configured to:
receive a request from the trading partner to perform the action;
determine from the state model how the action affects the state of the transaction; and
change the state of the transaction.

13. The non-transitory computer-readable medium of claim 11, wherein the software is further configured to:
receive a request from the trading partner to perform a second action;
determine from the state model that the trading partner does not have action access to the second action of the transaction based on the state of the transaction; and
prevent the trading partner from having action access to the second action.

14. The non-transitory computer-readable medium of claim 10, wherein the software is further configured to:
receive a request from the trading partner for viewing a second transaction;
determine from the state model that the trading partner does not have viewing access to the second transaction based on the state of the transaction; and
prevent the trading partner from having access to the second transaction.

15. The non-transitory computer-readable medium of claim 10, wherein the software is further configured to:
provide a default state model for use as the state model, the default state model having preconfigured descriptions.

16. The non-transitory computer-readable medium of claim 10, wherein the transaction comprises one from the group comprising: a forecast order, a purchase order, a billing, a product shipment, a payment, an invoice, a credit memo, a request for quote (RFQ), and a return material authorization (RMA).

17. The non-transitory computer-readable medium of claim 10, wherein an action comprises one from the group comprising: create, accept, cancel, close, defer, delete, finish, modify line, receive, reject, reply with changes, request to cancel, ship, split line, undo cancel, and undo close.

18. The non-transitory computer-readable medium of claim 10, wherein the plurality of states of the transaction comprise private draft, public draft, open, published, pending, commit, closed, and superseded.

19. A computer-implemented system, comprising:
a transaction state module tangibly embodied on a non-transitory computer-readable medium configured to:

store data representing a plurality of states of transactions among a plurality of trading partners in a supply chain;

determine a state model for a transaction that describes a plurality of states of the transaction, the state model comprising accessibility parameters of a transaction by a trading partner based on a role of the trading partner in the supply chain and transition parameters for transition of the transaction amongst the plurality of states; and provide the trading partner access to the transaction in accordance with the accessibility parameters of the state model.

20. The system of claim 19, wherein the transaction state module is further configured to:

determine action privilege parameters of the trading partner based on the role of the trading partner in the supply chain; and determine that the trading partner has access to perform an action on the transaction in accordance with the action privilege parameters.

21. The system of claim 20, further comprising:

a web interface, coupled in communication with the transaction state module, the web interface tangibly embodied on a non-transitory computer-readable medium and configured to receive a request from the trading partner to perform the action; and a supply chain database, coupled in communication with the transaction state module, that stores the state model, wherein the transaction state module is further configured to determine from the state model how the action affects the state of the transaction, and to change the state of the transaction.

22. The system of claim 20, further comprising:

a web interface, coupled in communication with the transaction state module, the web interface tangibly embodied on a non-transitory computer-readable medium and configured to receive a request from the trading partner to perform a second action; and a supply chain database, coupled in communication with the transaction state module, that stores the state model, wherein the transaction state module is further configured to determine from the state model that the trading partner does not have action access to the second action of the transaction based on the state of the transaction, and to prevent the trading partner from having action access to the second action.

23. The system of claim 19, further comprising:

a web interface, coupled in communication with the transaction state module, the web interface tangibly embodied on a non-transitory computer-readable medium and configured to receive a request from the trading partner to access a second transaction;

a supply chain database, coupled in communication with the transaction state module, that stores the state model, wherein the transaction state module is further configured to determine from the state model that the trading partner does not have access to the second transaction based on the state of the transaction, and to prevent the trading partner from having access to the second transaction.

* * * * *